(12) United States Patent
Asai (10) Patent No.: US 6,710,511 B2
(45) Date of Patent: Mar. 23, 2004

(54) MOVING MEMBER FOR SURFACE ACOUSTIC WAVE ACTUATOR AND SURFACE ACOUSTIC WAVE ACTUATOR USING SAME

(75) Inventor: Katsuhiko Asai, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 203 days.

(21) Appl. No.: 10/040,899

(22) Filed: Jan. 9, 2002

(65) Prior Publication Data

US 2002/0101131 A1 Aug. 1, 2002

(30) Foreign Application Priority Data

Jan. 9, 2001 (JP) ..................... P2001-001063

(51) Int. Cl.$^7$ .............................. H01L 41/08
(52) U.S. Cl. ............... 310/313 R; 310/323.02
(58) Field of Search ............... 310/334, 323.02, 310/323.03, 313 R (56) References Cited

U.S. PATENT DOCUMENTS 5,006,749 A * 4/1991 White ................. 310/323.03
6,285,113 B1 * 9/2001 Asai et al. ............. 310/313 R
6,331,747 B2 * 12/2001 Yoshida et al. ......... 310/313 R

FOREIGN PATENT DOCUMENTS

JP 10-296186 11/1998
JP 11-146665 5/1999

* cited by examiner

*Primary Examiner*—Mark Budd
(74) *Attorney, Agent, or Firm*—Browdy and Neimark (57) ABSTRACT

The present invention aims at providing a moving member for a surface acoustic wave actuator which undergoes little change of phase under the action of a pressing force and which can improve the drive efficiency of the surface acoustic wave actuator, as well as a surface acoustic wave actuator using the moving member. For achieving this object, projection-arranged portions and gap portions are formed in parallel with a surface acoustic wave propagating direction on a contact surface of the moving member for contact with a stationary member in such a manner that the ratio of the width of each of the projection-arranged portions to that of each of the gap portions is in the range of between 1:4 and 1:10. With this configuration, it is possible to suppress the influence of a phase change of a surface acoustic wave having passed the projection-arranged portions.

According to this configuration, moreover, it becomes possible to increase the pressing force for pushing the moving member against the stationary member and hence possible to increase the drive force. Thus, there is obtained a moving member for a surface acoustic wave actuator capable of attaining both saving of electric power and improvement of a drive force and hence capable of improving the drive efficiency of the actuator.

10 Claims, 7 Drawing Sheets

Gap portions

Surface acoustic wave propagating direction

Gap portions

Surface acoustic wave propagating direction

Fig.4

Gap portions

Surface acoustic wave propagating direction

MOVING MEMBER FOR SURFACE ACOUSTIC WAVE ACTUATOR AND SURFACE ACOUSTIC WAVE ACTUATOR USING SAME

BACKGROUND OF THE INVENTION

1. Field of the Invention

The present invention relates to a moving member for a surface acoustic wave actuator and a surface acoustic wave actuator using the same.

2. Description of Prior Art

Figure 1:
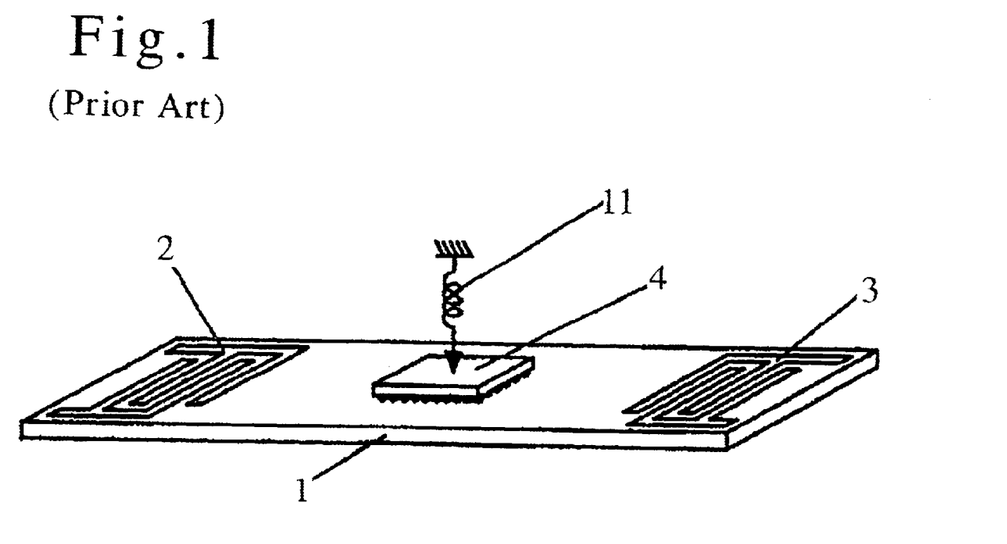
FIG. 1 is a schematic diagram showing a basic configuration of a conventional surface acoustic wave actuator.

Surface acoustic wave actuators have potential for use as small linear actuators due to their advantages of high speed and high thrust driving capabilities with a small size. FIG. 1 illustrates a basic configuration of a conventional surface acoustic wave actuator. In the illustrated surface acoustic wave actuator, a moving member (or slider) 4 with an elastic force supply source 11 for providing a pressing force is mounted on a stator 1 with IDTs (Interdigital transducers) 2 and 3 deposited on both sides thereof. In connection with performance of the surface acoustic wave actuator it is shown in a report appearing on page 275 of Proceedings in the $21^{st}$ Symposium on Ultrasonic Electronics that a drive force of approximately 8N is obtained by pressing a slider against a surface acoustic wave device with a force of 80N, the slider made of silicon has a large umber of projections of pillar form on Its contact surface. It is also shown therein that the drive force is improved by increasing the contact rate (contact area per slider surface area) and pressing force.

On the other hand, in the configuration of the surface acoustic wave actuator shown in the above report, energy of the surface acoustic wave excited by the IDTs is used only partially for driving the slider, while the other greater part thereof is consumed by a absorber, so that the energy efficiency is greatly deteriorated. For solving this problem there has been proposed such an energy efficiency improving method as is disclosed in JP-A Nos. 10-296186 and 11-146665. In such a power-saving type surface acoustic wave actuator, energy of a surface acoustic wave which has passed through a portion of contact with a slider without being used for driving the slider, is circulated and is combined with energy of a newly excited surface acoustic wave to improve the energy efficiency.

Figure 2:
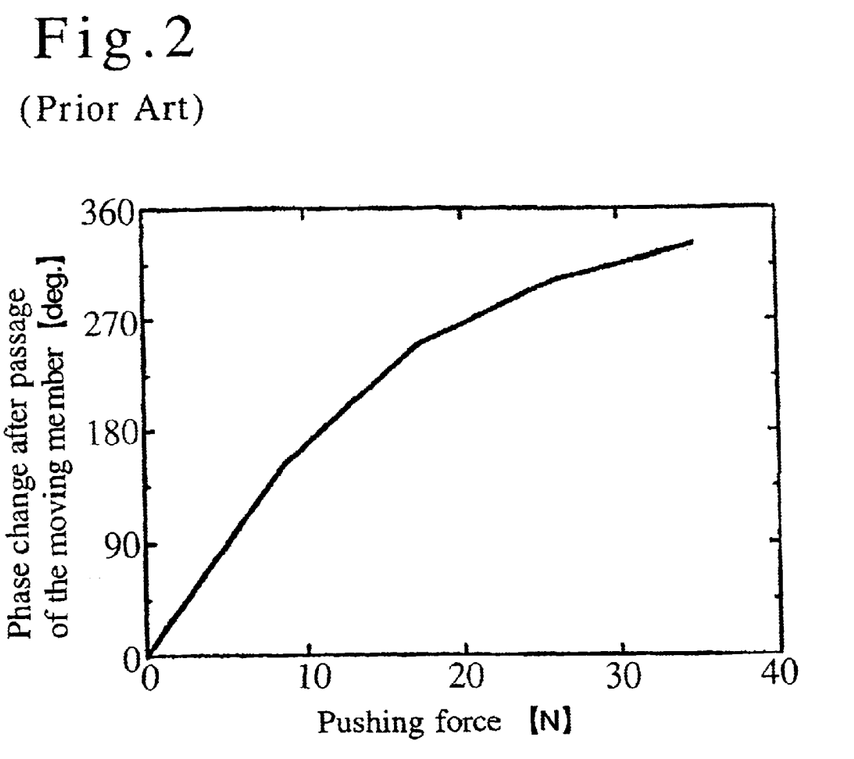
FIG. 2 is a characteristic diagram showing, as an experimental result, the magnitude of a pressing force versus a change in phase of a surface acoustic wave having passed a portion of contact with a moving member.

For improving the energy efficiency by using the method disclosed in the above unexamined publications or another method involving circulation of a surface acoustic wave energy, it is necessary that the phase of the circulated surface acoustic wave and that of the excited surface acoustic wave be made coincident with each other. If there is a phase shift, the energy of the circulated surface acoustic wave and that of the excited surface acoustic wave offset each other partially, making it no longer possible to improve the energy efficiency. However, if a slider having a high contact rates is pushed against a stator for the purpose of increasing the drive force and improving the drive efficiency, there occurs a change in phase of the surface acoustic wave which has passed the portion of contact with the slider, depending on the magnitude of the pressing force. FIG. 2 is an example of an experimental result in the prior art, showing how the phase of a surface acoustic wave which has passed the portion of contact with the slider varies according to the magnitude of the pressing force.

Such a phase change makes it impossible to improve the energy efficiency, resulting in that the drive efficiency as an actuator can no longer be improved. Also in case of setting the pressing force to a force of one-cycle phase shift it is necessary to make the change of phase uniform throughout the whole of the slider or take an appropriate measure against a change in the state of contact between ON and OFF conditions, thus also involving a difficulty in the improvement of drive efficiency.

SUMMARY OF THE INVENTION

The present invention has been accomplished in view of the above-mentioned points and it is an object of the invention to provide a moving member like a slider for a surface acoustic wave actuator which undergoes little change of phase under the action of a pressing force and which can improve the drive efficiency of the surface acoustic wave actuator, as well as a surface acoustic wave actuator using the moving member.

For achieving the above-mentioned object, in a first aspect of the present invention there is provided a moving member for a surface acoustic wave actuator, which is pushed against a stationary member having a surface acoustic wave exciting means and to which a drive force is imparted through a frictional force by a surface acoustic wave propagated on the stationary member, characterized in that projection-arranged portions and gap portions are formed in parallel with the surface acoustic wave propagating direction on a contact surface of the moving member for contact with the stationary member in such a manner that the ratio of the width of each of the projection-arranged portions to that of each of the gap portions is in the range of between 1:4 and 1:10.

According to this configuration, a change of phase is caused by a change in propagation speed which results from contact of projections with the stationary member, so projection-arranged portions and gap portions are formed in parallel with the surface acoustic wave propagating direction on the contact surface of the moving member for contact with the stationary member, that is, gap portions not influenced by the contact of projections are formed, allowing a surface acoustic wave to be propagated therethrough at a constant propagation speed, whereby the influence of a phase change of the surface acoustic wave having passed the projection-arranged portions can be suppressed.

As a result, it becomes possible to increase the pressing force for pushing the moving member against the stationary member and hence possible to increase the drive force and improve the drive efficiency of the surface acoustic wave actuator.

Preferably, the ratio of the width of each of the projection-arranged portions to that of each of the gap portions is set to a value in the range of between 1:4 and 1:10. This is because both improvement of energy efficiency and improvement of drive force can be attained and it is possible to improve the drive efficiency. If the ratio is lower than 1:4, the phase change becomes too large to improve the energy efficiency, and if the ratio is higher than 1:10, the contact rates becomes too low to improve the drive force.

With the moving member for a surface acoustic wave actuator according to the present invention, there occurs little change of phase caused by the pressing force and it is possible to improve the drive efficiency of the surface acoustic wave actuator. According to the moving member for a surface acoustic wave actuator in the first aspect of the present invention which is pushed against a stationary member having a surface acoustic wave exciting means and to which a drive force is imparted through a frictional force by a surface acoustic wave propagated on the stationary member, projection-arranged portions and gap portions are formed in parallel with the surface acoustic wave propagating direction on a contact surface of the moving member for contact with the stationary member in such a manner the ratio of the width of each of the projection-arranged portions to that of each of the gap portions is in the range of between 1:4 and 1:10. With this configuration, a change in phase of the surface acoustic wave having passed the contact portion is suppressed by the surface acoustic wave propagated through the gap portions, thus making it possible to increase the force for pushing the moving member against the stationary member and thereby increase the drive force, whereby there is obtained a surface acoustic wave actuator of a high drive efficiency.

In a second aspect of the present invention there is provided, in combination with the above first aspect, a moving member for a surface acoustic wave actuator wherein all the gap portions are equal in width. According to this configuration it is possible to obtain a phase change suppressing effect which is uniform throughout the whole of the moving member.

In a third aspect of the present invention there is provided, in combination with the above first aspect, a moving member for a surface acoustic wave actuator wherein two or more projections are formed in each of the projection-arranged portions. According to this configuration it is possible to improve the phase change suppressing effect because a change of phase is suppressed by the surface acoustic wave propagated through the gap portions each formed between adjacent projection portions.

In a fourth aspect of the present invention there is provided, in combination with the above third aspect, a moving member for a surface acoustic wave actuator wherein the projections formed in each of the projection-arranged portions are arranged at an equal interval. According to this configuration the phase change suppressing effect can be further improved because the phase change suppression by the surface acoustic wave propagated through the gap portions is effected at a constant interval.

In a fifth aspect of the present invention there is provided, in combination with the above first aspect, a moving member for a surface acoustic wave actuator wherein all of the projections formed in the projection-arranged portions are the same in shape. According to this configuration it is possible to unify the influence of phase change.

In a sixth aspect of the present invention there is provided, in combination with the first aspect, a moving member for a surface acoustic wave actuator wherein each of the projections has a contact area of not larger than 400 $\mu m^2$. According to this configuration it is possible to diminish the change of phase caused by the projections and hence possible to further improve the phase change suppressing effect by the surface acoustic wave propagated through the gap portions.

In a seventh aspect of the present invention there is provided, in combination with the above first aspect, a moving member for a surface acoustic wave actuator wherein a contact ratio in the whole of the moving member is in the range of between 0.01 and 0.25. According to this configuration it is possible to suppress the phase change while ensuring a contact area required for improving the drive force and so there is obtained a surface acoustic wave actuator of a high drive efficiency.

In an eighth aspect of the present invention there is provided a surface acoustic wave actuator using a moving member which is pushed against a stationary member having a surface acoustic wave exciting means and to which a drive force is imparted through a frictional force by a surface acoustic wave propagated on the stationary member, the moving member having projection-arranged portions and gap portions, the projection portions and the gap portions being formed in parallel with the surface acoustic wave propagating direction on a contact surface of the moving member for contact with the stationary member in such a manner that the ratio of the width of each of the projection-arranged portions to that of each of the gap portions is in the range of between 1:4 and 1:10. According to this configuration, even if the pressing force for pushing the moving member against the stationary member is made large, a change in phase of the surface acoustic wave having passed the contact portion is suppressed and so there is obtained a surface acoustic wave actuator of a high drive efficiency.

In a ninth aspect of the present invention there is provided a magnetic disk unit using a surface acoustic wave actuator as a head driving actuator, the surface acoustic wave actuator using a moving member which is pushed against a stationary member having a surface acoustic wave exciting means and to which a drive force is imparted through a frictional force by a surface acoustic wave propagated on the stationary member, the moving member having projection-arranged portions and gap portions, the projection-arranged portions and the gap portions being formed in parallel with the surface acoustic wave propagating direction on a contact surface of the moving member for contact with the stationary member in such a manner that the ratio of the width of each of the projection-arranged portions to that of each of the gap portions is in the range of between 1:4 and 1:10. By using a surface acoustic wave motor according to the present invention there is obtained a magnetic disk unit superior in access performance.

In a tenth aspect of the present invention there is provided an optical disk unit using a surface acoustic wave actuator as a head driving actuator, the surface acoustic wave actuator using a moving member which is pushed against a stationary member having a surface acoustic wave exciting means and to which a drive force is imparted through a frictional force by a surface acoustic wave propagated on the stationary member, the moving member having projection-arranged portions and gap portions, the projection-arranged portions and the gap portions being formed in parallel with the surface acoustic wave propagating direction on a contact surface of the moving member for contact with the stationary member in such a manner that the ratio of the width of each of the projection-arranged portions to that of each of the gap portions is in the range of between 1:4 and 1:10. By using a surface acoustic wave motor according to the present invention there is obtained an optical disk unit superior in access performance.

Thus, the moving member for a power-saving type surface acoustic wave actuator according to the present invention has projection-arranged portions and gap portions formed on its surface for contact with the stationary member in parallel with the surface acoustic wave propagating direction in such a manner that the ratio of the width each of the projection-arranged portions to that of each of the gap portions is in the range of between 1:4 and 1:10. According to this configuration, a change in phase of the surface acoustic wave having passed the contact portion can be suppressed by the surface acoustic wave propagated through the gap portions, so it becomes possible to increase the pressing force for pushing the moving member against the stationary member and hence possible to increase the drive force, whereby there is obtained an excellent effect that the improvement in drive efficiency of the surface acoustic wave actuator can be attained.

Accordingly, it is a first object of the present invention to provide a moving member for a surface acoustic wave actuator which undergoes little change in phase under the action of an external pressing force and which therefore can improve the drive efficiency of the actuator.

It is a second object of the present invention to provide a surface acoustic wave actuator using a moving member which undergoes little change in phase under the action of an external pressing force and which therefore can improve the drive efficiency of the actuator.

These objects and advantages of the present invention will become more apparent from the following embodiment of the invention taken in connection with the accompanying drawings.

DESCRIPTION OF THE PREFERRED EMBODIMENTS

Embodiments of the present invention will be described hereinunder.
First Embodiment FIG. 3 comprises a front view and a bottom view of a moving member (or a slider) for a surface acoustic wave motor according to an embodiment of the present invention. In the same figure, a slider 4 has projections in parallel with a surface acoustic wave propagating direction, with gaps being formed each between adjacent such projections.

Figure 3:
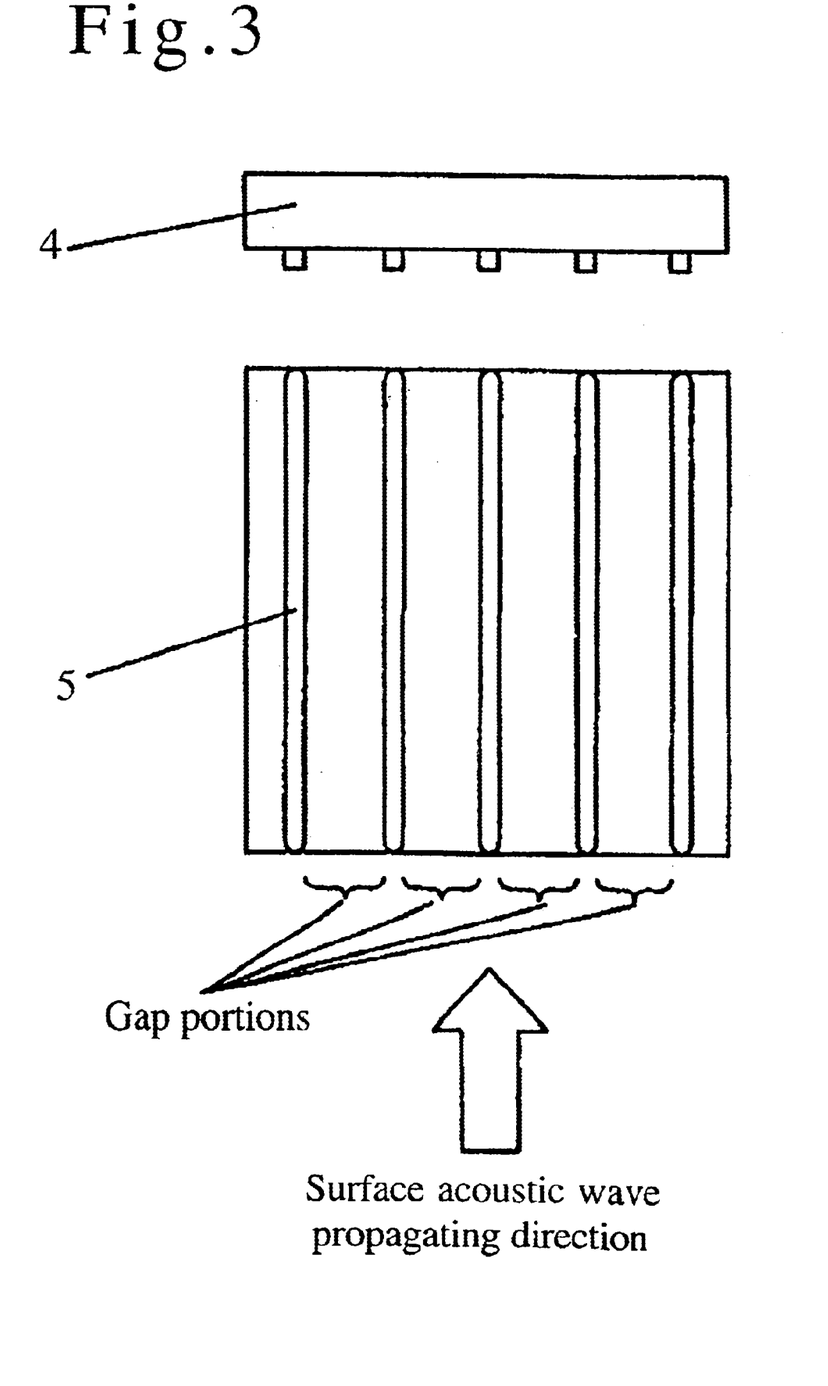
FIG. 3 is a schematic diagram showing a moving member for a surface acoustic wave actuator according to a first embodiment of the present invention.

Silicon is preferred as the material of the slider because it can be subjected to processing easily with use of a semiconductor manufacturing process such as dry etching. By pushing the projection-formed surface of the slider 4 against a surface acoustic wave propagating portion of a stationary member (or a stator) which has a surface acoustic wave exciting means, a drive force for the slider 4 can be obtained through a frictional force.

Preferably, the stator is formed of an piezoelectric material. For example, $LiNbO_3$, which is a piezoelectric crystal plate, may be used. This material is preferred in point of its electromechanical coupling coefficient being large. Non-piezoelectric materials are also employable if a thin piezoelectric film such as a thin ZnO film is used as a surface acoustic wave exciting means.

Since a surface acoustic wave propagated on a surface of contact with projections 5 changes in propagation speed, the phase thereof changes with respect to a surface acoustic wave not in contact with the slider. On the other hand, a surface acoustic wave passing through gap portions each formed between adjacent projections 5 becomes less influential as it is spaced away from the surface of contact with the projections 5, so that the phase of the surface acoustic wave propagated centrally of the gap portions does not change.

As a result, in the surface acoustic wave having passed the slider 4, the portion thereof whose phase does not change becomes dominant, whereby the phase change of the surface acoustic wave caused by contact of the slider is suppressed. Therefore, it becomes possible to increase the force for pushing the slider 4 against the stator, which is for the purpose of increasing the drive force, thus affording a surface acoustic wave actuator of a high drive efficiency.

Uniform presence of the surface acoustic wave which has passed through the gap portions and which does not change in phase is more effective for suppressing a change of phase and therefore it is desirable for the phase change suppressing purpose that all the gap portions be equal in width.
Second Embodiment FIG. 4 comprises a front view and a bottom view of a slider for a surface acoustic wave motor according to a second embodiment of the present invention. In this embodiment, plural projection-arranged portions are formed in parallel with a surface acoustic wave propagating direction and plural projections are spacedly aligned in the extending direction of each of the projection-arranged portions.

Figure 4:
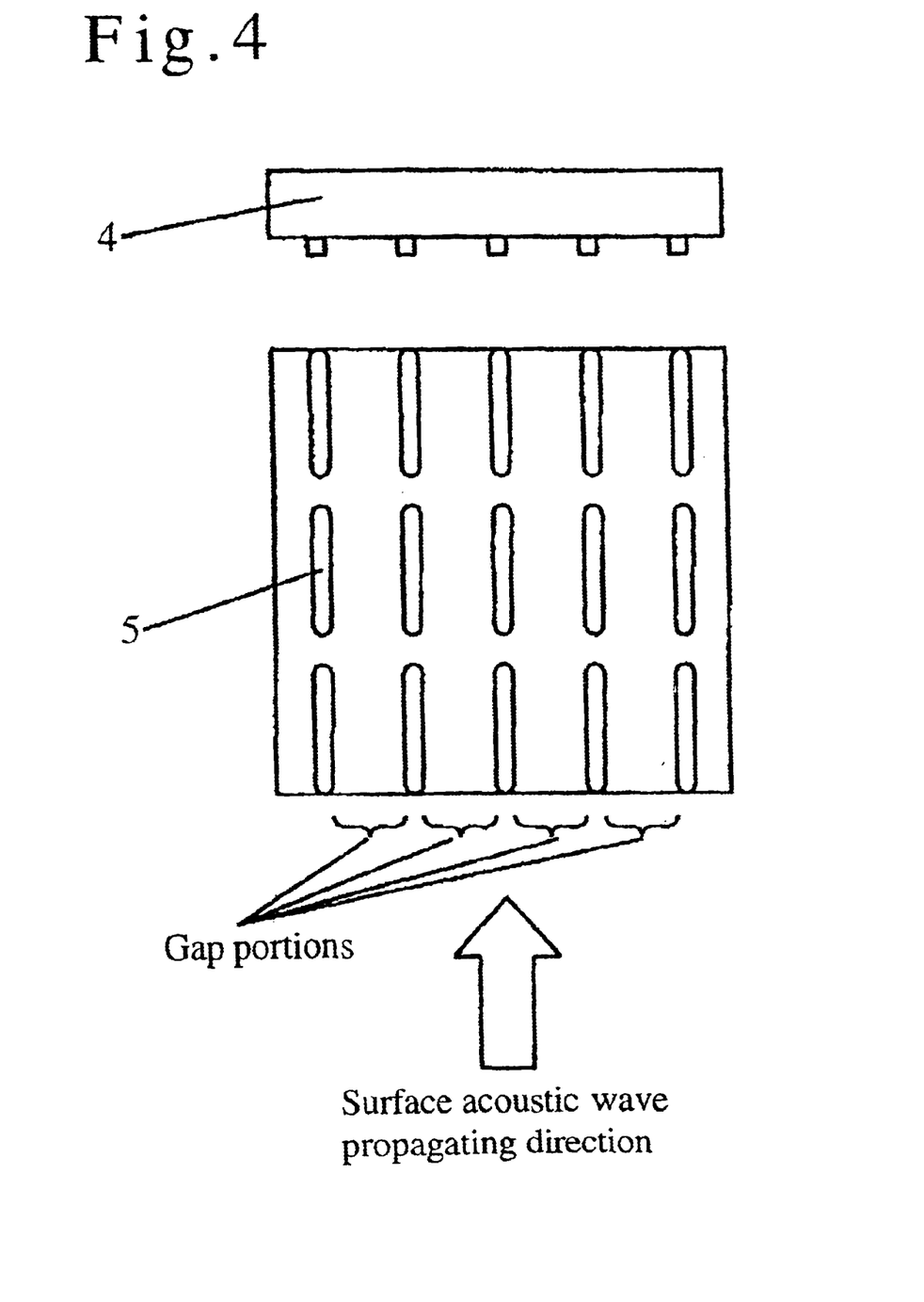
FIG. 4 is a schematic diagram showing a moving member for a surface acoustic wave actuator according to a second embodiment of the present invention.

Suppression of phase change of the surface acoustic wave passing through the slider is not performed at the moment the surface acoustic wave passes the slider, as in the first embodiment, but is performed every moment that the surface acoustic wave reaches the gap portions formed by constructing the projection-arranged portions by a plurality of projections. Therefore, the phase change suppressing effect is improved to a greater extent than in the first exobodiment and there is obtained a surface acoustic wave actuator of a higher drive efficiency.

There will be obtained a more effective suppression of phase change if the projections formed in each projection-arranged portion are spaced at predetermined certain intervals, so it is preferable that the projections formed in the projection-arranged portions be spaced at equal intervals in the extending direction of the projection-arranged portions.

It is also preferable that all the projections in question be of the same shape. This is because the influence of the projections on phase change becomes uniform. If the projection size is too large, there will be a particularly significant influence on the Rayleigh wave and the change of phase also increases. With this point in mind, it is preferable that the contact area of each projection be 400 $\mu m^2$.

Further, also in the entire slider, it is preferable that the ratio of the projection contact area to the area of the entire contact surface with projections formed thereon of the slider be not smaller than 0.01 and that for phase change suppression the ratio be not larger than 0.25.

Third Embodiment

Figure 5:
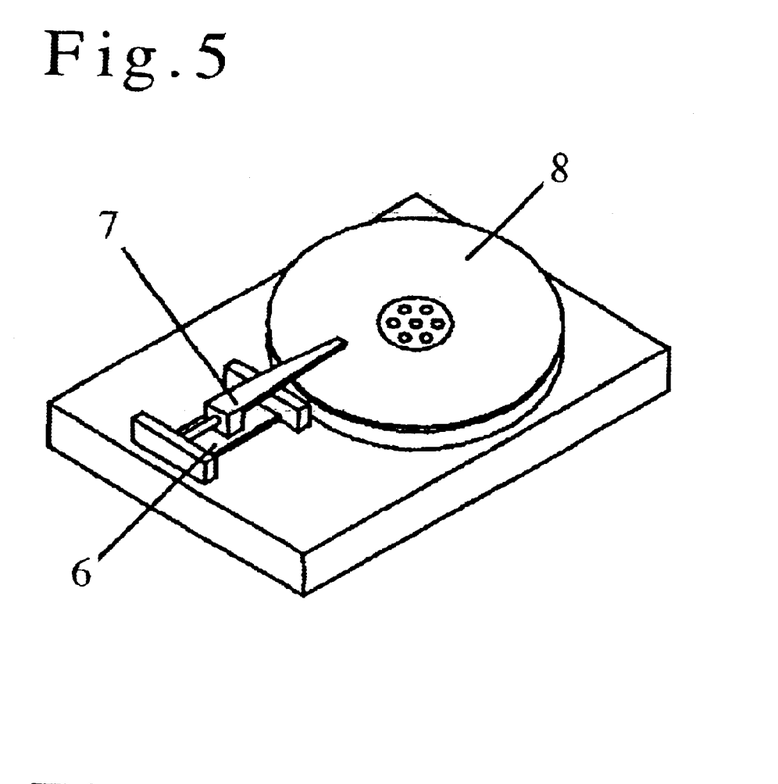
FIG. 5 is a schematic diagram showing a surface acoustic wave actuator according to a third embodiment of the present invention.

FIG. 5 is a schematic diagram showing a surface acoustic wave actuator according to a third embodiment of the present invention. As shown in the same figure, a head arm 7 is attached to the surface acoustic wave actuator 6 described in the second embodiment and there is made positioning thereof with respect to a magnetic disk 8.

By using the surface acoustic wave actuator according to this embodiment as a head driving actuator in the magnetic disk it becomes possible to effect a precise positioning of the head and there is obtained a magnetic disk unit superior in access performance.

Fourth Embodiment

Figure 6:
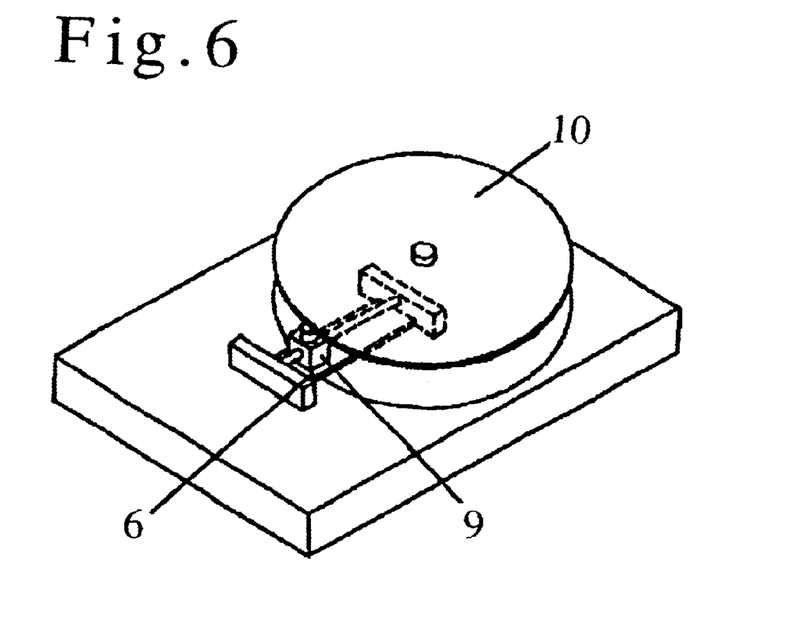
FIG. 6 is a schematic diagram showing a surface acoustic wave actuator according to a fourth embodiment of the present invention.

FIG. 6 is a schematic diagram showing a surface acoustic wave actuator according to a fourth embodiment of the present invention. As shown in the same figure, an optical head 9 is attached to the surface acoustic wave actuator 6 described in the second embodiment and there is made positioning thereof with respect to an optical disk 10.

By using the surface acoustic wave actuator according to this embodiment as a head driving actuator in the optical disk it becomes possible to establish a position of the head precisely, thus affording an optical disk unit superior in access performance.

The present invention is not limited to the above embodiments, but various modifications maybe made in accordance with the gist of the present invention, which modifications are also included in the present invention.

Enforcement Example

As an example according to the present invention there was fabricated a slider having a projection-arranged portion width of 20 $\mu m$ and a gap portion width of 100 $\mu m$. In projection-arranged portions are arranged cylindrical, 20 $\mu m$ dia. projections at 120 $\mu m$ pitches. The slider is formed 4 mm square by 0.5 mm thick using silicon and the projections were formed by dry etching. The total number of projections in this slider is 1,089.

To check the effect of the slider, the slider was pushed against a stator and a surface acoustic wave was measured for phase change. For comparison, the measurement was performed also with respect to a slider having cylindrical, 20 $\mu m$ dia. projections formed at 40 $\mu m$ pitches in projection-arranged portions.

As the stator there was used a substrate of 128 degrees rotated y-cut x-propagating $LiNbO_3$, with aluminum IDT formed thereon using photoresist. The IDT had an electrode width of 66.5 $\mu m$, a pitch of 266 $\mu m$, an aperture size of 8 mm, and a strip electrode pairs of 21. Drive frequency was set at 14.4 MHz.

Figure 7:
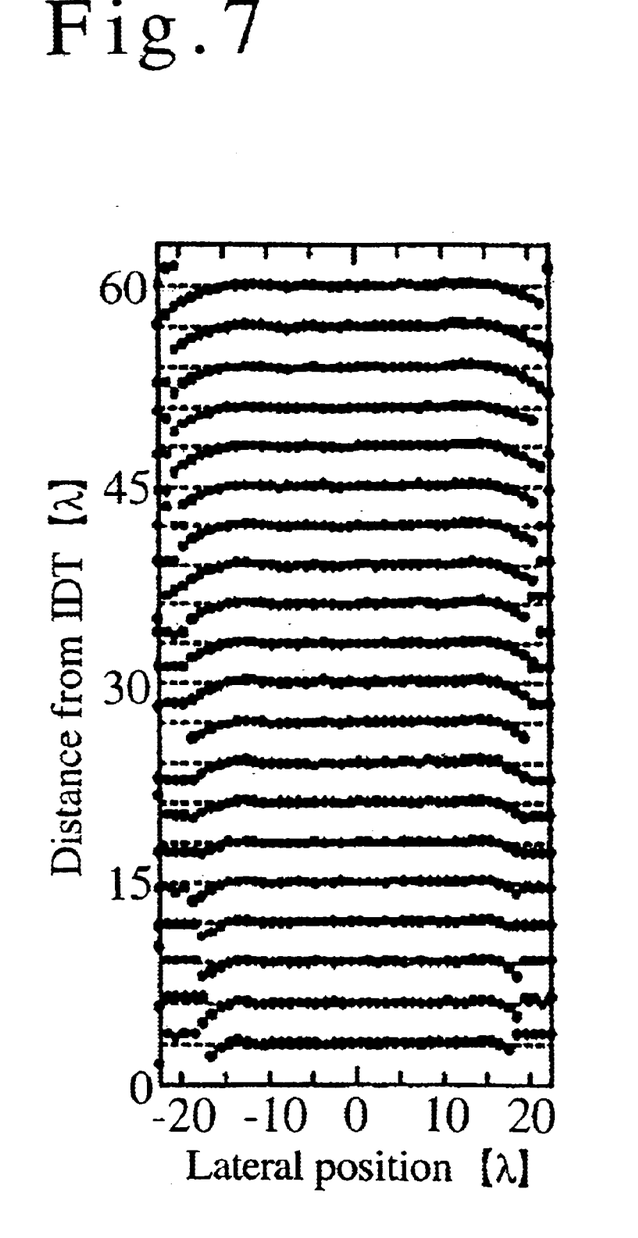
FIG. 7 is a characteristic diagram showing a phase distribution of a surface acoustic wave propagated on a stationary member (or a stator) in a state in which a moving member embodying the present invention is not pushed against the stationary member.
Figure 8:
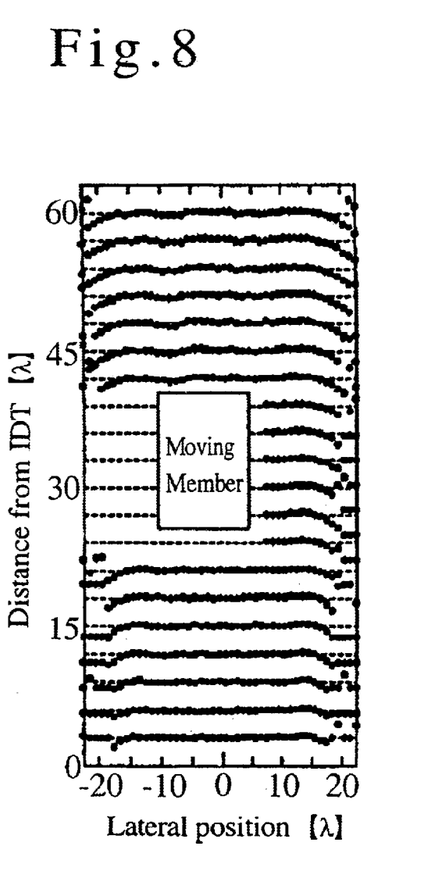
FIG. 8 is a characteristic diagram showing a phase distribution of a surface acoustic wave propagated on a stationary member in a state in which a moving member embodying the present invention is pushed against the stationary member.
Figure 9:
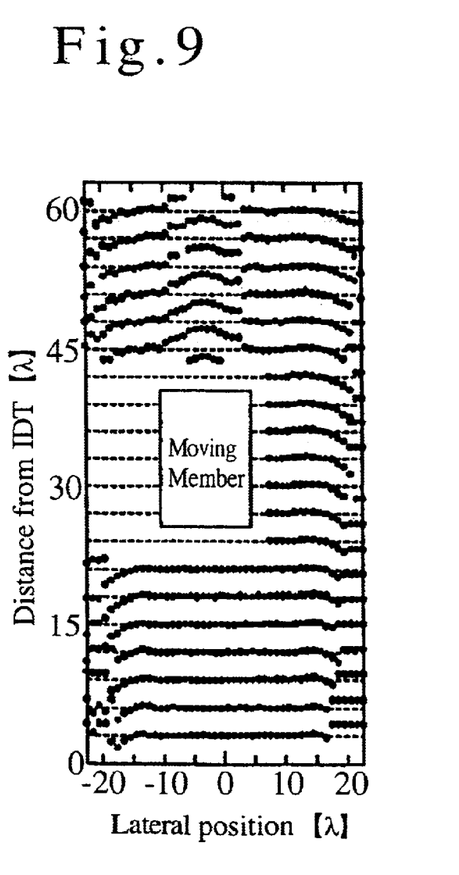
FIG. 9 is a characteristic diagram showing a phase distribution of a surface acoustic wave propagated on a stationary member in a state in which a moving member used for comparison with a moving member embodying the present invention is pushed against the stationary member.

FIGS. 7, 8 and 9 show results of having measured the phase of a surface acoustic wave on the stator without pushing any slider against the stator, with the slider of this example pushed against the stator, and with the comparative slider pushed against the stator, respectively. There was adopted a pressing force of 17.4N.

In these measurement results, the measurement position is standardized at a wavelength $\lambda$ (266 $\mu m$) of the surface acoustic wave. The range of the aperture size, wherein the surface acoustic wave is excited, is from $-15\lambda$ to $15\lambda$ in lateral direction. The range of contact of the slider is from $-10.5\lambda$ to $4.5\lambda$ in lateral direction and the distance from IDT is $25.5\lambda$ to $40.5\lambda$.

A certain area lying in the range of $24\lambda$ to $42\lambda$ as the distance from electrode is covered with a mechanism for pushing the slider against the stator and therefore no measurement data are available with respect to the area.

In these figures, a phase shift at each measuring point is represented by a positional shift in the wave propagating direction. More specifically, measurement points lie at every $3\lambda$ distance from IDT, so when the distance of a certain measurement point from a drive electrode is $n[\lambda]$ and a phase change therein is $p[rad]$, a point is marked at a distance of $n+1.5\times p/\pi$ from IDT.

That is, at a phase shift of $\pi$, a point is marked at a middle position between adjacent measurement points. From the measurement results it is seen that there occurs little change of phase, in other words, a phase change is suppressed, in the case of the slider of the example according to the present invention wherein the ratio of the width of each projection-arranged portion to that of each gap portion is 1:5, but that there occurs a marked change of phase in the case of the comparative slider wherein the ratio of the width of each projection-arranged portion to that of each gap portion is 1:1.

Although the present invention has been described above on the basis of its preferred embodiments illustrated in the drawings, it is evident to any person skilled in the art that the present invention can be changed and modified easily. Such changes and modifications are also included in the scope of the present invention.

What is claimed is:

1. A moving member for a surface acoustic wave actuator, which is pushed against a stator having a surface acoustic wave exciting means and to which a drive force is imparted through a frictional force by a surface acoustic wave propagated on the stationary member, wherein projection-arranged portions and gap portions are formed in parallel with the surface acoustic wave propagating direction on a contact surface of the moving member for contact with the stationary member in such a manner that the ratio of the width of each of the projection-arranged portions to that of each of the gap portions is in the range of between 1:4 and 1:10.

2. A moving member for a surface acoustic wave actuator according to claim 1, wherein all the gap portions are equal in width.

3. A moving member for a surface acoustic wave actuator according to claim 1, wherein two or more projections are formed in each of the projection-arranged portions.

4. A moving member for a surface acoustic wave actuator according to claim 3, wherein the projections formed in each of the projection-arranged portions are arranged at an equal interval.

5. A moving member for a surface acoustic wave actuator according to claim 1, wherein all of the projections formed in the projection-arranged portions are the same in shape.

6. A moving member for a surface acoustic wave actuator according to claim 1, wherein each of the projections has a contact area of not larger than 400 $\mu m^2$.

7. A moving member for a surface acoustic wave actuator according to claim 1, wherein a contact ratio in the whole of the moving member is in the range of between 0.01 and 0.25.

8. A surface acoustic wave actuator using a moving member which is pushed against a stationary member having a surface acoustic wave exciting means and to which a drive force is imparted through a frictional force by a surface acoustic wave propagated on the stationary member, the moving member having projection-arranged portions and gap portions, the projection-arranged portions and the gap portions being formed in parallel with the surface acoustic wave propagating direction on a contact surface of the moving member for contact with the stationary member in such a manner that the ratio of the width of each of the projection-arranged portions to that of each of the gap portions is in the range of between 1:4 and 1:10.

9. A magnetic disk unit using a surface acoustic wave actuator as a head driving actuator, the surface acoustic wave actuator using a moving member which is pushed against a stationary member having a surface acoustic wave exciting means and to which a drive force is imparted through a frictional force by a surface acoustic wave propagated on the stationary member, the moving member having projection-arranged portions and gap portions, the projection-arranged portions and the gap portions being formed in parallel with the surface acoustic wave propagating direction on a contact surface of the moving member for contact with the stationary member in such a manner that the ratio of the width of each of the projection-arranged portions to that of each of the gap portions is in the range of between 1:4 and 1:10.

10. An optical disk unit using a surface acoustic wave actuator as a head driving actuator, the surface acoustic wave actuator using a moving member which is pushed against a stationary member having a surface acoustic wave exciting means and to which a drive force is imparted through a frictional force by a surface acoustic wave propagated on the stationary member, the moving member having projection-arranged portions and gap portions, the projection-arranged portions and the gap portions being formed in parallel with the surface acoustic wave propagating direction on a contact surface of the moving member for contact with the stationary member in such a manner that the ratio of the width of each of the projection-arranged portions to that of each of the gap portions is in the range of between 1:4 and 1:10.

* * * * *